US011970652B1

(12) United States Patent
Grieve

(10) Patent No.: US 11,970,652 B1
(45) Date of Patent: Apr. 30, 2024

(54) THERMAL ENERGY STORAGE WITH ACTIVELY TUNABLE PHASE CHANGE MATERIALS

(71) Applicant: MicroEra Power Inc., Rochester, NY (US)

(72) Inventor: Malcolm James Grieve, Pittsford, NY (US)

(73) Assignee: MICROERA POWER INC., Rochester, NY (US)

( * ) Notice: Subject to any disclaimer, the term of this patent is extended or adjusted under 35 U.S.C. 154(b) by 0 days.

(21) Appl. No.: 18/138,364

(22) Filed: Apr. 24, 2023

Related U.S. Application Data

(60) Provisional application No. 63/446,054, filed on Feb. 16, 2023.

(51) Int. Cl.
| | |
|---|---|
| *C09K 5/06* | (2006.01) |
| *F24F 5/00* | (2006.01) |
| *F28D 20/02* | (2006.01) |

(52) U.S. Cl.
CPC ............ *C09K 5/063* (2013.01); *F24F 5/0021* (2013.01); *F28D 20/028* (2013.01); *F24F 2005/0025* (2013.01); *F24F 2203/021* (2013.01)

(58) Field of Classification Search
CPC ......... C09K 5/06; C09K 5/063; F28D 20/028; F24F 5/0021
See application file for complete search history.

(56) References Cited

U.S. PATENT DOCUMENTS 3,984,993 A * 10/1976 Muska ................ C09K 5/06
62/48.1
4,199,021 A * 4/1980 Thoma ................ C09K 5/063
126/400
(Continued)

FOREIGN PATENT DOCUMENTS

| AU | 4933493 B2 | 6/1996 |
|---|---|---|
| CA | 457273 A | 6/1949 |

(Continued)

OTHER PUBLICATIONS

Utaka, Y. et al., "A Method of Efficient Ice Cool Energy Storage Using Heat Transfer of Direct Contact Phase Change Between Working Medium and PCM in an Enclosure" Transactions of the Japan Society of Refrigerating and Air Conditioning Engineers (Apr. 1988) pp. 117-131, vol. 5, Issue 1.

(Continued)

*Primary Examiner* — Christopher R Zerphey
(74) *Attorney, Agent, or Firm* — Carter, DeLuca & Farrell LLP

(57) ABSTRACT

A thermal energy storing system includes two or more volumes of a formulation of active material. The formulation of active material in each of the two or more volumes includes a solvent and one or more of a salt, a base, or an acid as the active material. The formulation of active material in each of the two or more volumes also has multiple congruent solid/liquid phase transitions at different concentrations of the solvent. A phase transition temperature of each volume of the two or more volumes of the formulation of active material can be adjusted by changing the concentration of solvent in each formulation. This tunability notably improves the performance and cost effectiveness of heat pumps, shifting electrical loads to lower-cost, off-peak/renewable-intensive periods, improving efficiency, and enabling recovery of low-grade renewable and waste heat.

(Continued)

The system has a relatively small footprint, which is particularly attractive in urban applications.

27 Claims, 8 Drawing Sheets

(56) References Cited

U.S. PATENT DOCUMENTS

| | | | |
|---|---|---|---|
| 4,272,392 A * | 6/1981 | Lane | C09K 5/063 |
| | | | 165/902 |
| 4,403,645 A | 9/1983 | MacCracken | |
| 4,406,804 A | 9/1983 | Wada et al. | |
| 4,603,003 A * | 7/1986 | Van Hook | C09K 5/063 |
| | | | 252/70 |
| 4,689,164 A | 8/1987 | Ames | |
| 4,720,984 A | 1/1988 | Ames | |
| 4,850,424 A * | 7/1989 | Mitani | F28D 20/028 |
| | | | 165/10 |
| 4,872,557 A | 10/1989 | Ames | |
| 4,971,713 A | 11/1990 | Ames | |
| 5,037,571 A | 8/1991 | Ames | |
| 5,065,598 A * | 11/1991 | Kurisu | F24F 5/0017 |
| | | | 62/330 |
| 5,082,582 A | 1/1992 | Ames et al. | |
| 5,100,570 A | 3/1992 | Ames | |
| 5,139,078 A | 8/1992 | Ames et al. | |
| 5,389,275 A | 2/1995 | Ames | |
| 5,678,626 A | 10/1997 | Gilles | |
| 5,687,706 A | 11/1997 | Goswami et al. | |
| 6,247,522 B1 | 6/2001 | Kaplan et al. | |
| 6,629,413 B1 | 10/2003 | Wendt et al. | |
| 6,634,183 B1 * | 10/2003 | Jonsson | F25B 30/04 |
| | | | 62/480 |
| 7,260,940 B2 * | 8/2007 | Watanabe | F25B 23/00 |
| | | | 62/4 |
| 7,967,999 B2 * | 6/2011 | Tomura | C09K 5/063 |
| | | | 165/104.19 |
| 8,522,859 B2 | 9/2013 | Moilala et al. | |
| 8,839,642 B2 * | 9/2014 | Bolin | F28D 20/003 |
| | | | 62/235.1 |
| 9,163,868 B2 | 10/2015 | Ducheyne et al. | |
| 9,557,120 B2 | 1/2017 | Grama et al. | |
| 9,612,059 B2 * | 4/2017 | Xiang | F01K 3/008 |
| 9,671,171 B2 * | 6/2017 | Xiang | C09K 5/10 |
| 10,012,447 B2 | 7/2018 | Morgan et al. | |
| 10,088,243 B2 | 10/2018 | Grama et al. | |
| 10,197,338 B2 | 2/2019 | Melsheimer | |
| 10,222,135 B2 | 3/2019 | Owens et al. | |
| 10,267,569 B2 | 4/2019 | Altman et al. | |
| 10,267,571 B2 | 4/2019 | Krakow et al. | |
| 10,308,855 B2 | 6/2019 | Bissell et al. | |
| 10,317,146 B2 * | 6/2019 | Bissell | F28D 20/028 |
| 10,436,522 B2 | 10/2019 | Altman et al. | |
| 10,442,969 B2 | 10/2019 | Ueda | |
| 10,454,147 B2 | 10/2019 | Yang et al. | |
| 10,767,093 B2 | 9/2020 | Bissell et al. | |
| 11,022,381 B2 | 6/2021 | Barmeier | |
| 11,380,830 B2 | 7/2022 | Hiller et al. | |
| 11,384,994 B2 | 7/2022 | Ben Nun et al. | |
| 2011/0259544 A1 | 10/2011 | Neti et al. | |
| 2012/0279679 A1 | 11/2012 | Soukhojak et al. | |
| 2014/0318731 A1 | 10/2014 | Mucciardi et al. | |
| 2016/0053219 A1 | 2/2016 | Walker et al. | |
| 2017/0248377 A1 | 8/2017 | De Falco et al. | |
| 2020/0284527 A1 | 9/2020 | Ben Nun et al. | |
| 2021/0041183 A1 | 2/2021 | Ishmael et al. | |
| 2021/0222959 A1 | 7/2021 | Michaud et al. | |
| 2021/0325125 A1 | 10/2021 | Novek | |
| 2021/0340423 A1 | 11/2021 | Li et al. | |
| 2021/0340424 A1 | 11/2021 | Lee et al. | |
| 2021/0356178 A1 | 11/2021 | Novek | |
| 2022/0146210 A1 | 5/2022 | Saeed et al. | |
| 2022/0178560 A1 | 6/2022 | Ben Nun et al. | |
| 2022/0187028 A1 | 6/2022 | Ben Nun et al. | |
| 2023/0130589 A1 | 4/2023 | Sawafta et al. | |
| 2023/0194188 A1 | 6/2023 | De Jesus Teixeira | |

FOREIGN PATENT DOCUMENTS

| | | |
|---|---|---|
| CN | 2658659 Y | 11/2004 |
| CN | 102607308 B | 10/2014 |
| CN | 105505329 A | 4/2016 |
| CN | 104830278 B | 8/2018 |
| CN | 110628392 A | 12/2019 |
| CN | 209944849 U | 1/2020 |
| CN | 111187599 A | 5/2020 |
| CN | 113663615 A | 11/2021 |
| DE | 102017008115 A1 | 2/2019 |
| DE | 102022101812 A1 | 8/2022 |
| DK | 3120098 T3 | 6/2018 |
| EP | 0140467 A1 | 5/1985 |
| EP | 0428801 A1 | 5/1991 |
| EP | 2365023 A1 | 9/2011 |
| EP | 2713121 A2 | 4/2014 |
| EP | 2713130 A2 | 4/2014 |
| IN | 201741039073 | 1/2019 |
| IN | 202021004338 | 5/2020 |
| JP | 3457854 B2 | 10/2003 |
| JP | 2019137854 A | 8/2019 |
| JP | 2021111478 A | 8/2021 |
| JP | 2021172149 A | 11/2021 |
| KR | 20120021720 A | 3/2012 |
| KR | 20120097566 A | 9/2012 |
| KR | 102347363 B1 | 1/2022 |
| WO | 9404630 A1 | 3/1994 |
| WO | 01/35511 A2 | 5/2001 |
| WO | 2012065369 A1 | 5/2012 |
| WO | 2012176708 A1 | 12/2012 |
| WO | 2017125513 A2 | 7/2017 |
| WO | 2018188884 A1 | 10/2018 |
| WO | 2020098279 A1 | 5/2020 |
| WO | 2021072335 A1 | 4/2021 |
| WO | 2021076741 A1 | 4/2021 |
| WO | 2022112063 A1 | 6/2022 |

OTHER PUBLICATIONS

Utaka, Y. et al., "Gas Hydrate Cold Storage Using Direct-Contact Heat Transfer of Liquid-Vapor Phase Change and Natural Circulation of Refrigerant in Closed Vessel" Department of Mechanical Engineering, Tokyo Institute of Technology (May 1992) Paper No. 91-0858 B, abstract only.

* cited by examiner

100

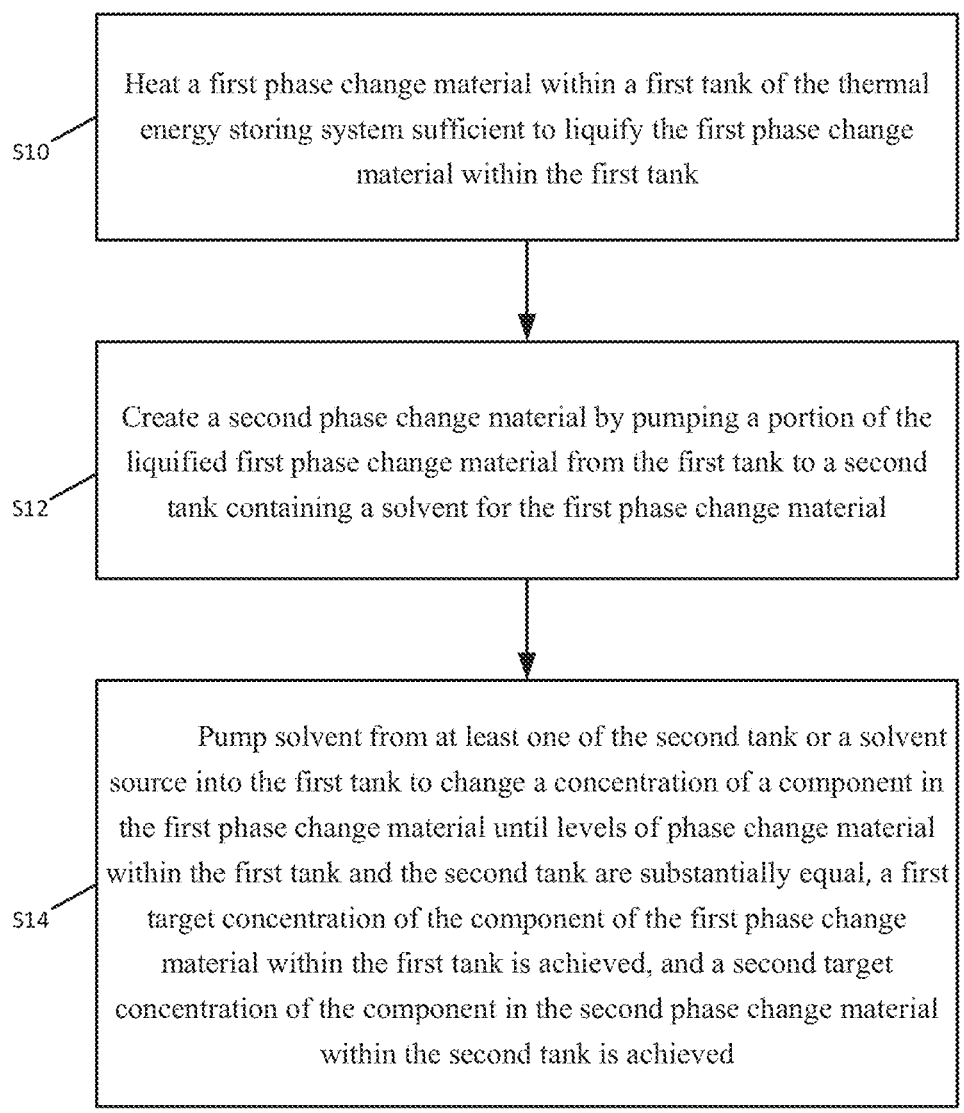

THERMAL ENERGY STORAGE WITH ACTIVELY TUNABLE PHASE CHANGE MATERIALS

CROSS-REFERENCE TO RELATED APPLICATIONS

This application claims the benefit of, and priority to, U.S. Provisional Patent Application No. 63/446,054, filed on Feb. 16, 2023, the entire contents of which are hereby incorporated herein by reference.

TECHNICAL FIELD

The present disclosure generally relates to thermal energy storage and thermal energy storage systems.

BACKGROUND

Unless otherwise indicated herein, the materials described in this section are not prior art to the claims herein and are not admitted as being prior art by inclusion in this section.

Heating, ventilation and air conditioning (HVAC) tends to be an on-peak energy load, especially for summer air conditioning. Thermal energy storage (TES) may be a useful technology for storing cooling for air conditioning or heat for heating. TES may utilize a phase change material (PCM) for thermal storage. TES systems may help to balance energy demand on thermal systems. TES systems may reduce peak energy demand and energy consumption on a daily, weekly, or seasonal basis and may increase the overall efficiency of energy systems. A TES system may be integrated with thermal systems that utilize renewable energy sources such as solar, wind, or tidal power and may aid reduction of CO2 emissions. A TES system may also be integrated with a thermal system such as a heat pump.

Many compounds or mixtures can be used as a PCM, and a PCM may have the property of congruent freezing/melting at a fixed temperature which may allow the PCM to store a relatively large amount of latent heat at a useful temperature. Integrating TES into an HVAC system may allow for off-peak or renewable-intensive electricity to be used to power a vapor compression heat pump, to freeze or condense a liquid or gas (for stored cooling), or to melt or evaporate a solid or liquid (for stored heat). The reverse phase change of a PCM may supply cooling or heat at a later time.

A TES may recover heat from sources such as solar thermal, on-site power generation (for example with internal combustion engines, gas turbines or fuel cells), or waste heat from an industrial process, ventilation exhaust or wastewater effluent. Refrigeration may use TES, using ice storage to provide resiliency to power outages. Cold storage may be achieved with a TES system that incorporates a low temperature eutectic PCM, for frozen food storage as well as during transport of food or medicine. Prior art latent heat TES systems using salt hydrates use a fixed composition of the material contained in a sealed metallic or plastic container. Additives may minimize supercooling, avoid phase separation, and improve heat transfer; however, additives may increase cost and lower a stored energy per unit volume. For some TES applications, a fixed temperature is acceptable, but for other applications such as building HVAC and district geothermal systems, tunability of the phase change temperature is highly desirable. What is needed is a tunable TES system, which can adapt to have high energy density at needed temperatures, and to have flexibility to store energy at the most efficient temperature based on weather (winter heating vs. summer cooling, hot/humid weather vs. less hot/dry weather, etc.), and to manage peak heating or cooling within the constraints of the available heat pump hardware and district energy network.

SUMMARY

Existing challenges associated with storing energy for heating and cooling, as well as other challenges, are overcome by the presently disclosed thermal energy storing systems and methods that allow (1) selective adjustment of the TES system from a cold storage mode to a heat storage mode, and/or back again from a heat storage mode to a cold storage mode, (2) selective adjustment of the TES system to different temperatures related to storage cooling (below room temperature), (3) selective adjustment of the TES system to different temperatures related to stored heat (above room temperature). The presently disclosed systems overcome known disadvantages of previous PCM-based systems such as low energy density, low power density, and low round-trip efficiency).

TES systems in accordance with the present disclosure employ active materials that, when formulated into solutions of different compositions, can provide three or more compositions, with congruent melting points, each of which undergoes a phase transition at a temperature useful for either stored heat or stored cooling. By adjusting the concentration of the active material in the formulation, the present thermal energy storage systems can be tuned to switch between heat storage and cooling storage or storage at different temperatures using the same active material in a single system, thereby reducing the footprint needed for effective energy storage. Once the concentration of the active material in the formulation is adjusted to one of the target compositions, heat or cooling energy can be applied to the composition during periods of low demand (typically times of low energy cost and/or lower carbon-intensity), with such heat or cooling energy being stored by the present system until needed during periods of high demand (typically times of high energy cost and/or higher carbon-intensity). Thus, the present thermal energy storage systems utilize the phase change materials as an effective latent heat thermal storage media to absorb or release energy during the phase change of the material in a ratio of as much fifteen times larger than sensible thermal energy storage materials. This latent heat advantage plus the tuning to optimal temperature allows the systems to not only have a relatively small footprint, hut also to collect or reject heat provided by renewable energy sources such as solar thermal panels or photovoltaic and thermal (PVt) panels, or by recovering low-grade sensible and latent heat from a fueled on-site power devices (such as proton-exchange membrane (PEM) fuel cells consuming hydrogen or a solid oxide fuel cells (SOFC) consuming methane, biogas or natural gas). Initially, the PCM behaves as a sensible heat storage as the temperature changes. At the transition point, the PCM absorbs or releases large amounts of heat at almost constant temperature. Once the transition is over, it continues to behave as a sensible storage material.

The presently disclosed TES systems can be integrated into HVAC systems and building infrastructure, where they can be used to shift power demands (e.g., for building climate control) from periods of peak demand to periods of low demand. The presently disclosed TES systems also may provide for incorporation of a thermal reservoir in residential or commercial buildings that could be tapped during periods of peak demand to facilitate reducing the peak demand level.

A thermal energy storage system in accordance with an aspect of the present disclosure includes two or more volumes of a formulation of active material. The formulation of active material in each of the two or more volumes includes a solvent and one or more of a salt, a base, or an acid as the active material. The formulation of active material in each of the two or more volumes also has multiple congruent solid phase transitions at different concentrations of the solvent. A phase transition temperature of each volume of the two or more volumes of the formulation of active material can be adjusted by changing the concentration of solvent in each formulation. The tunability can be large (for example reflecting seasonal shifts) or small (reflecting the ability to optimize between priorities peak load reduction (on peak days) and on efficiency improvement on most other days within a season). As an example of a large (seasonal) shift, in one state, the two volumes can be set to the same or a similar moderately concentrated concentration and in a second state, one volume is highly concentrated, and the other volume is very dilute or, in the limiting case, contains only the solvent (for example water). As an example of the small (optimization) shift, one state uses a eutectic (low melting point) composition in both tanks, and in a second state, one volume is more diluted, and the other volume is more concentrated. In both types of tunability, the total material (solute and solvent) within the system is unchanged, which is critically important for durability and ease of maintenance.

In aspects, the phase transition temperature of each volume of the two or more volumes of the formulation of active material may be adjusted seasonally to (a) store cooling for air conditioning or (b) store heat for space heating. In aspects, the phase transition temperature of each volume of the two or more volumes of the formulation of active material may be adjusted to either: store energy on an evaporator side of a heat pump; or store energy on a condenser side of the heat pump, for flexibility in shifting peak loads, boosting efficiency, and/or optimizing heating or cooling capacity of the HVAC system. While a number of possible salt, acid or base active materials have multiple congruent hydrate and eutectic phase transitions, two particular active materials are well suited to aspects of the present disclosure, based on low cost, stability, energy density, and tendency to supercool. These are sodium hydroxide (NaOH) and magnesium nitrate ($Mg(NO_3)_2$) with or without additives.

In aspects, at least one volume of the two or more volumes of the formulation of active material may include: the base sodium hydroxide (as the one or more of a salt, a base, or an acid); and water as the solvent. In aspects, at least one volume of the two or more volumes of the formulation of active material may include about 39% NaOH by weight (being the hydrate $NaOH \cdot 3.5H_2O$) which has a congruent melting temperature of about 16° C. In aspects, at least one volume of the two or more volumes of the formulation of active material may include about 53% NaOH by weight (being the hydrate $NaOH \cdot 2H_2O$) which has a near-congruent melting temperature of about 13° C.

In aspects, at least one volume of the two or more volumes of the formulation of active material may include about 46% NaOH by weight (being a eutectic composition, which is includes crystallization of both the 2-hydrate and 3.5-hydrate, and which has a congruent melting temperature of about 6° C.

In aspects, at least one volume of the two or more volumes of the formulation of active material may store heat or act as a source temperature for a high temperature heat pump, and may use the $NaOH \cdot H_2O$ hydrate or a eutectic which is slightly depleted of water with respect to this hydrate, and having a concentration of from about 69% to about 72% NaOH by weight, at a congruent melting temperature of about 65° C. and about 62° C. respectively.

In other aspects, the formulation of active material may include: the salt magnesium nitrate (as the one or more of a salt, a base, or an acid); and water as the solvent. In aspects, at least one volume of the two or more volumes of the formulation of active material may include about 58% $Mg(NO_3)_2$ by weight (being the hydrate $Mg(NO_3)_2 \cdot 6H_2O$) which has a congruent melting temperature of about 90° C. In aspects, at least one volume of the two or more volumes of the formulation of active material may include about 80.5% $Mg(NO_3)_2$ by weight (being the hydrate $Mg(NO_3)_2 \cdot 2H_2O$) or the nearby eutectic, which is slightly depleted of water from the 2-hydrate formulation, both of which have a congruent melting temperature of about 130° C.

In aspects, the formulation of active material may include the eutectic between the 6-hydrate and 2-hydrate, having a congruent melting point of about 50° C. and a composition of about 68% $Mg(NO_3)_2$ by weight. 50° C. is close to the temperature of waste heat from data centers and is also a supply temperature for district heating systems operating at low capacity. A temperature of 50° C. may also be an attractive source temperature for a high temperature heat pump, boosting capacity in a district heating system or supplying very hot water or low-pressure steam to industrial process.

In embodiments of the present disclosure, a TES system includes a first tank containing a volume of a formulation of active material including a solvent and one or more of a salt, a base, or an acid as the active material, the formulation having multiple congruent solid phase transitions at different concentrations of the solvent. The thermal energy storing system further includes a temperature controller configured to control a temperature of the formulation within the first tank, and a concentration controller configured to adjust the concentration of the solvent in the formulation.

In aspects, the concentration controller is configured to adjust the concentration of the solvent in the formulation by controlling any one or a combination of the following: an inert gas supply configured to provide a purge gas to adjust a phase transition temperature of the formulation, a solvent supply configured to provide solvent to adjust a concentration of the solvent in the formulation, and a separator configured to perform one or more of impart a vacuum on the volume of the formulation to remove solvent, sparge the formulation to remove solvent, and membrane separate solvent from the formulation. The concentration controller is further configured to communicate with the temperature control to evaporate, volatize, or sparge solvent out of the formulation.

In aspects, a concentration of the solvent is seasonally adjusted to (a) store cooling for air conditioning or (b) store heat for space heating.

In aspects, a phase transition temperature of the volume of the formulation is adjusted to either: store energy on an evaporator side of a heat pump; or store energy on a condenser side of the heat pump.

In aspects, sodium hydroxide is the active material and water is the solvent, and a concentration of water is adjusted to provide a formulation containing about 39% sodium hydroxide by weight, and having a melting temperature of about 16° C.

In such aspects, a temperature of the formulation is adjusted to a freezing temperature below about 16° C. or to a melting temperature above about 16° C.

In aspects, sodium hydroxide is the active material and water is the solvent, and a concentration of water is adjusted to provide a formulation containing about 46% sodium hydroxide by weight, and having a melting temperature of about 6° C. In such aspects, a temperature of the formulation is adjusted to a freezing temperature below about 6° C. or to a melting temperature above about 6° C.

In aspects, sodium hydroxide is the active material and water is the solvent, and a concentration of water is adjusted to provide a formulation containing about 53% sodium hydroxide by weight, and having a melting temperature of about 13° C. Unlike all of the other phase transitions described for NaOH and $Mg(NO_3)_2$, this is not strictly a congruent phase change, but, based on supercooling, we have observed a sharp freezing transition at this temperature, and 13° C. is a very useful temperature for stored cooling and dehumidification. In such aspects, a temperature of the formulation is adjusted to a temperature below about 13° C. for freezing and complete melting by about 35° C.

Each of these three temperatures (6° C., 13° C., and 16° C.) are very well matched to stored cooling. As examples: (1) in a very dry (desert) climate 25° C. can be a comfortable indoor temperature, which can be readily supplied from stored cooling with 3.5-hydrate at 16° C., (2) in a humid climate, 13.9° C. is a reasonable evaporator temperature to reach 50% relative humidity at 25° C., which can be supplied by the 2-hydrate at low cooling load or unoccupied periods, whereas 10.2° C. is needed for premium air conditioning targeting 50% relative humidity and 21° C., which can be supplied by the 6° C. eutectic during periods of high cooling load and high occupancy.

TABLE 1

Evaporator Air temperature required for dehumidification

| Thermostat Set Point | 40% RH | 50% RH |
|---|---|---|
| 25° C. | 10.5° C. | 13.9° C. |
| 23° C. | 8.7° C. | 12.1° C. |
| 21° C. | 6.9° C. | 10.2° C. |

The ability to store at the optimal temperature has a major impact on heat pump efficiency, because a small temperature difference between evaporator and condenser temperature dramatically improves the coefficient of performance of the heat pump.

In aspects, sodium hydroxide is the active material and water is the solvent, and a concentration of water is adjusted to provide a formulation containing about 73% sodium hydroxide by weight, and having a melting temperature of about 62° C. In such aspects, a temperature of the formulation is adjusted to a freezing temperature below about 62° C. or to a melting temperature above about 62° C.

In aspects, sodium hydroxide is the active material and water is the solvent, and a concentration of water is adjusted to provide a formulation containing about 69% sodium hydroxide by weight, and having a melting temperature of about 65° C. In such aspects, a temperature of the formulation is adjusted to a freezing temperature below about 65° C. or to a melting temperature above about 65° C.

In these two cases (69% and 73% by weight), a second volume can be pure water, which of course freezes and melts as 0° C. but also has a relatively high heat capacity which can be used to capture and store heat above or below the melting point of 65 or 62° C. respectively). This can be very useful in efficiently meeting varying space heating and domestic hot water loads.

In other aspects, magnesium nitrate is the active material and water is the solvent, and a concentration of water is adjusted to provide a formulation containing about 58% $Mg(NO_3)_2$ by weight, and having a melting temperature of about 90° C. In such aspects, a temperature of the formulation is adjusted to a freezing temperature below about 90° C. or to a melting temperature above about 90° C.

In yet other aspects, magnesium nitrate is the active material and water is the solvent, and a concentration of water is adjusted to provide a formulation containing about 80.5% magnesium nitrate by weight, and has a melting temperature of about 130° C. In such aspects, a temperature of the formulation is adjusted to a freezing temperature below about 130° C. or to a melting temperature above about 130° C.

In yet other aspects, magnesium nitrate is the active material and water is the solvent, and a concentration of water is adjusted to provide a formulation containing about 68% magnesium nitrate by weight (being the eutectic between the 6-hydrate and 2-hydrate), and has a melting temperature of about 50° C. In such aspects, a temperature of the formulation is adjusted to a freezing temperature below about 50° C. or to a melting temperature above about 50° C.

In aspects, the system further includes a second tank configured to collect and condense solvent evaporated from the first volume of the formulation of active material. In aspects, the second tank contains a second volume of a formulation of active material including a solvent and one or more of a salt, a base, or an acid as the active material, the formulation having a congruent solid phase transitions at different lower concentrations of the solvent or contains only the solvent (typically water).

In aspects, the thermal energy system includes a source of the active material and a pump configured to pump active material into the first tank. The addition of active material may be used to maintain the volume in the first tank about constant to compensate for the volume of solvent extracted from the first tank.

In aspects, the thermal energy storage system includes a source of solvent and a pump configured to pump solvent into the first tank.

In aspects, the second tank may contain essentially water. This renders the second tank suitable for: sensible heat storage, leveraging the relatively high heat capacity of water, upon either the evaporator or condenser side of the heat pump; and potentially for latent heat storage from the freezing and melting at about 0° C. as a supplement to the latent heat storage of the active material formulation in the first tank. This is useful in extreme weather, such as the polar vortex in the USA during Christmas week of 2022. For example, it is well known that the heating power and efficiency of an air source heat pump drop during extreme winter weather (for example with an outdoor temperature of −25° C.), whereas freezing water with the evaporator side of the heat pump (which keeps the evaporator close to 0° C.), while supplying heat to the building and/or charging a higher temperature PCM formulation on the condenser side of the heat pump has notably higher heating capacity and efficiency.

In aspects, the active material is a salt, a base, or an acid having a solvent ligand, and a concentration of the solvent is adjusted by substantially depleting the active material of the solvent ligand to less than ratio of solvent/active material of the lowest complex compound. This permits the system to operate in a thermochemical mode, where the concentration of active material is increased above its lowest hydrate to approach anhydrous composition (subject to the temperature limits of the tank material used). For example, by raising the temperature well above the melting point and applying a vacuum on the 73% NaOH by weight formulation, additional thermal energy is stored beyond the heat of fusion. This thermochemical mode is less efficient than the freezing/melting strategy because higher temperatures are required, but the higher capacity of heat storage may be valuable during winter "demand response" periods associated with extremely cold weather.

In aspects, the system further includes a source of inert gas configured to pump inert gas, such as nitrogen, into a head space of the first tank.

In aspects, the system further includes a heat exchanger configured to recover one of heating or cooling from the first tank.

In aspects, the system includes a lance to trigger crystallization of the formulation remote from an energy source.

In aspects, a method of improving heat transfer during the freezing process of a formulation, wherein the formulation includes a solvent and one or more of a salt, a base, or an acid as an active material and the formulation has multiple congruent solid phase transitions at different concentrations of the solvent, the method includes supercooling a liquid phase of the formulation of phase change material with a heat exchanger. The method includes circulating the supercooled liquid phase of the formulation by natural or active convection toward previously frozen formulation material. The method includes crystallizing a first portion of the supercooled liquid phase of the formulation upon the previously frozen formulation material. The method includes heating the remaining portion of the supercooled liquid phase of the formulation via the heat of crystallization of the crystallized first portion. The method includes recirculating the remaining portion of the supercooled liquid phase of the formulation toward the heat exchanger.

In aspects a method of operation of a thermal energy system, wherein the thermal energy system includes a first tank which contains a formulation of active material which primarily stores heat as latent heat by melting said formulation and a second tank which contains essentially pure water. The method includes (a) in conditions where moderate heating loads are predicted, heating the second tank to store sensible heat in a normal temperature range between room temperature and the melting point of the concentrated formulation in the first tank. The method includes (b) in conditions where high heating loads are predicted, heating both the second and the first tanks. Additional heat is stored in the first tank by partially or fully melting said formulation, and optionally continuing to heat one or both tanks to store sensible heat above the melting point of the formulation. The method includes selecting a method of delivering heat to a building or process at a later time, from one of the following: (w) recovering stored heat from said second tank by heat exchange with a heat transfer fluid which delivers heat to the building or process, such that a heat pump compressor load of a heat pump is fully or partially reduced, (x) sourcing stored heat from said second tank by using the water in the second tank as an optional energy source to an evaporator side of the heat pump to transfer heat to the heat transfer fluid which delivers heat to the building or process, (y) recovering heat from said first tank, by heat exchange with the heat transfer fluid which delivers heat to the building or process, such that the heat pump compressor load is fully or partially reduced; or (z) using two or more of (w), (x), and/or (y) in series, to initially preheat the heat transfer fluid to a first temperature and then complete heating of said heat transfer fluid to a target temperature. In extreme seasonal conditions, the water may be cooled below its freezing point to supply additional heat to the building or process, by freezing said water as the energy source for said heat pump.

In yet another aspect, methods of tuning a thermal energy storing system are disclosed. The methods may include providing a volume of a formulation of active material including a solvent and one or more of a salt, a base, or an acid as the active material, and then selectively adjusting the solvent content in the formulation between: a first concentration having a congruent melting temperature above 80° C.; and a second concentration having a congruent melting temperature at or below 55° C. being, for example, a useful temperature window peak and off-peak operation in a district heating system. In aspects, providing a volume of a formulation of active material may include providing a solution of NaOH and water. In other aspects, providing a volume of a formulation of active material may include providing various solutions of $Mg(NO_3)_2$ and water.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of the scope of the disclosure, the disclosure will be described with additional specificity and detail through use of the accompanying drawings, in which:

FIG. 7 illustrates a flow diagram for an example method to adjust a thermal energy storing system to a cool storage mode in accordance with the present disclosure.

DETAILED DESCRIPTION

Figure 1:
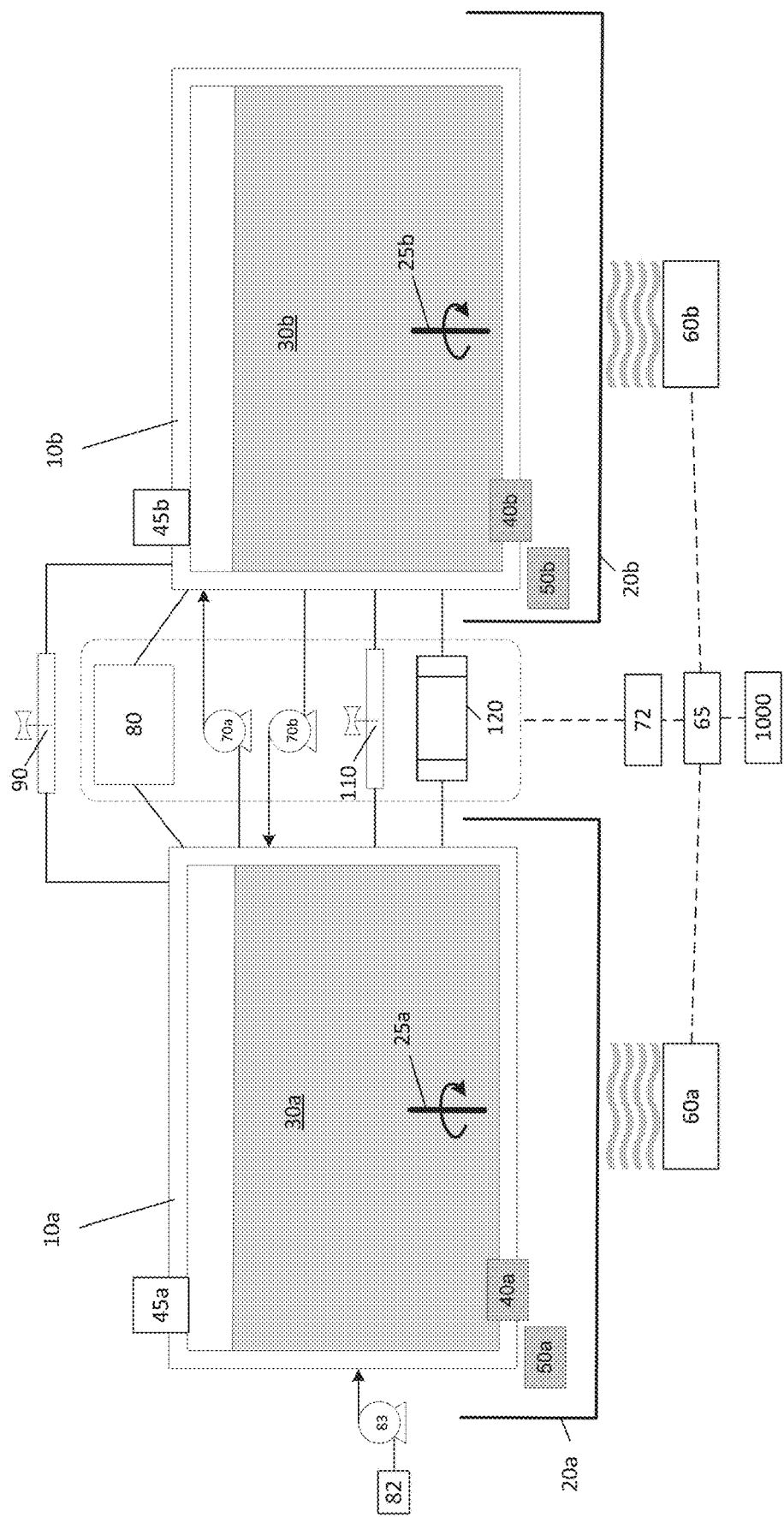
FIG. 1 is a Thermal Energy Storage (TES) system in accordance with an exemplary embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Terms including "generally," "about," "substantially," and the like, as utilized herein, are meant to encompass variations, e.g., compositional and/or other variations.

TES systems in accordance with the present disclosure may include two or more tanks. Phase change materials (PCMs) are modified within the tanks to configure the presently disclosed TES systems to store either heat or cooling as desired, or high or low temperature, as desired. The modification of the PCMs may include adjusting (increasing or decreasing) the concentration of a component of the PCMs, or in some cases, removing the PCM from one of the two tanks. When the TES system is configured to store heat, the system is in what is referred to sometimes herein as "winter mode". When the TES system is configured to store cooling, the system is in what is referred to sometimes herein as "summer mode". An advantage of the presently described systems is that they can be easily switched from winter mode to summer mode (and back to winter mode again) seasonally as needed.

FIG. 1 illustrates a TES system arranged in accordance with at least some embodiments described herein. TES system 100 may include a first tank 10a and a second tank 10b. Tanks 10a and 10b may be constructed from any suitable materials, such as for example: metal, plastic (such as HDPE or ETFE), or composite material and may be double walled and insulated to robustly contain solutions therein. Tanks 10a, 10b may be sealed, and materials within tanks 10a, 10b may be pressurized or under vacuum or at atmospheric pressure. Tanks 10a, 10b may each include a mixing element 25a and 25b, respectively. Mixing elements 25a, 25b may be magnetic drive mixing elements or any other mixing element known in the art. Tank 10a may be arranged within a leak containment tray 20a and tank 10b may be arranged within a leak containment tray 20b. Tank 10a may include a leak sensor 40a and tank 10b may include a leak sensor 40b. Leak sensor 40a may be located between/within double walls of tank 10a and leak sensor 40b may be located between/within double walls of tank 10b. Leak containment tray 20a may include a leak sensor 50a and leak containment tray 20b may include a leak sensor 50b. Leak sensors 40a, 40b, 50a, and 50b may sense properties such as pH or electrical conductivity within a fluid.

Tank 10a may include a phase change material (PCM) 30a and tank 10b may include a PCM 30b. PCMs 30a, 30b may be a formulation of a solvent and an active material, such as a salt, acid or base. As discussed in more detail below, the concentration of the solvent in the PCM may be adjusted to provide formulations having different phase change temperatures. PCMs 30a, 30b may be complex compounds with a set of solvent/solute ratios which define different compositions which freeze and melt at a range of useful temperatures. Mixing elements 25a, 25b may provide active mixing within tanks 10a, 10b to avoid phase separation of PCMs 30a, 30b, particularly prior to freezing transitions, and to enhance heat transfer during freezing and melting by active convection. The solute material of PCMs 30a, 30b may be contained within tanks 10a, 10b, and the concentration of solvent in tanks 10a,10b may be seasonally varied to provide nominal transition temperatures in an optimal range.

The solvent may be water, and the composition may further include a second additive, such as, for example, ammonia, methanol or other alternative small molecules. In cases where both water and a second additive (such as ammonia or methanol) are used, a transition temperature may be modified by changing a concentration of the second additive. A binary or ternary mixture as described may be fine-tuned to adjust the transition temperature on a frequent (day-to-day) basis.

TES system 100 may be configured to adjust or tune a concentration of a component of PCM 30a within tank 10a and/or a concentration of a component of PCM 30b within tank 30b. Tuning a concentration of a component of PCM 30a within tank 10a and/or a concentration of a component of PCM 30b within tank 10b may adjust a freeze and/or melt temperature of PCM 30a and/or PCM 30b so that TES system 100 may provide different amounts of heat and/or cold storage based on different seasonal heating/cooling requirements of TES system 100. TES system 100 may further include: vents 45a, 45b to release vapor from tanks 10a, 10b; pumps 70a, 70b to move material between tanks 10a and 10 b; an inert gas supply 80; a water supply 90; a distilled or deionized water supply 110; and a separator 120.

TES system 100 may include a temperature controller 65 configured to control a temperature of PCM 30a formulation within tank 10a and PCM 30b formulation in tank 10b. Temperature controller 65 may be in communication with energy source 60a and energy source 60b and control energy source 60a and energy source 60b by direct wire, over a network, or any other form of communication known in the art. Energy source 60a may be configured to adjust a temperature of PCM 30a and supply heat to tank 10a sufficient to heat tank 10a to a temperature of about 70° C. to about 140° C., and energy source 60b may be configured to adjust a temperature of PCM 30b and supply heat to tank 10b sufficient to heat tank 10b to a temperature of about 70° C. to about 140° C. Energy source 60a and energy source 60b may be any energy/heat source known in the art including a resistive heat source, a heat pump, renewable heat source, and/or waste heat. Vent 45a, may be configured to vent tank 10a and vent 45b may be configured to vent tank 10b. Pump 70a may be configured to pump material from tank 10a to tank 10b, and pump 70b may be configured to pump material from tank 10b to tank 10a.

Inert gas supply 80 may be configured to provide an inert gas to tanks 10a and 10b as necessary to fill head space in tanks 10a and 10b and may be used as a purge gas to adjust a phase transition temperature of PCM 30a and PCM 30b within tanks 10a and 10b. Inert gas supply 80 may supply nitrogen as the inert gas, although any inert gas may be used. Water supply 90 may be configured to supply water to tank 10a and/or tank 10b. Water supplied by water supply 90 may rinse or clean tank 10a and/or tank 10b. Distilled or deionized water supply 110 may be configured to supply distilled or deionized water to tank 10a and/or tank 10b. Distilled or deionized water supplied by distilled or deionized water supply 110 may be a solvent to adjust (reduce or dilute) a concentration of a component (solute) within PCM 30a or PCM 30b. Separator 120 may be in physical communication with tank 10a and tank 10b. Separator 120 may be configured to assist in the separation or removal of solvent (e.g., water) from PCM 30a or PCM 30b within tanks 10a and 10b, respectively and may adjust (increase or concentrate) a concentration of a component within PCM 30a or PCM 30b by (1) imparting a vacuum on the volume of PCM 30a or PCM 30b to remove solvent, (2) sparging PCM 30a or PCM 30b to remove solvent, or (3) membrane separation of a solvent from PCM 30a or PCM 30b.

A concentration controller 72 may be in communication with and pumps 70a and 70b, inert gas supply 80, distilled or deionized water supply 110, and separator 120 by direct wire, over a network, or any other form of communication known in the art. Concentration controller 72 may separately or in combination control pumps 70a and 70b, inert gas supply 80, distilled or deionized water supply 110, and separator 120 to adjust a concentration of a component within PCM 30a or PCM 30b. Concentration controller 72 may be in communication with temperature controller 65 and may interact with temperature controller 65 to control energy sources 60a and 60b to heat tank 10a and/or tank 10b to evaporate, volatize, or sparge solvent out of PCM 30a and/or PCM 30b to adjust a concentration of a component within PCM 30a or PCM 30b. Concentration controller 72 may interact with temperature controller 65 to control energy sources 60a and 60b to maintain a temperature of tank 10a and/or tank 10b while concentration controller controls separator 120 to sparge solvent out of PCM 30a and/or PCM 30b to adjust a concentration of a component within PCM 30a or PCM 30b. Concentration controller 72 may control pump 70a to pump material from tank 10a to tank 10b, and pump 70b to pump material from tank 10b to tank 10a to adjust a concentration of a component within PCM 30a or PCM 30b and/or to maintain a constant level of liquid PCM 30a or PCM 30b within tank 10a or 10b. Concentration controller 72 may control inert gas supply 80 to provide a purge gas to adjust a phase transition temperature of PCM 30a and PCM 30b within tanks 10a and 10b. Concentration controller 72 may control distilled or deionized water supply 110 to provide distilled or deionized water as a solvent to adjust (reduce or dilute) a concentration of a component (solute) within PCM 30a or PCM 30b. Concentration controller 72 may control separator 120 to adjust (increase or concentrate) a concentration of a component within PCM 30a or PCM 30b by (1) imparting a vacuum on the volume of PCM 30a or PCM 30b to remove solvent, (2) sparging PCM 30a or PCM 30b to remove solvent, or (3) membrane separation of a solvent from PCM 30a or PCM 30b.

Concentration controller 72 may also be in communication with and control a pump 83. Pump 83 may be in communication with tank 10a and a source 82 of the active material and may be configured to pump active material into tank 10a. Upon addition of active material to first tank 10a a volume in first tank 10a may be maintained about constant by evaporating solvent from a volume of PCM 30a as described above.

A controller 1000 may include a discrete processor and memory unit and may be in communication with temperature controller 65 and concentration controller 72 an as discussed in more detail below may automatically operate TES system 100 and may interact with one or more of the HVAC system of the building, a building management system, and an electric grid demand management system (not shown).

When the active material is a salt, a base, or an acid having a solvent ligand, separator 120 may be configured to substantially deplete the active material of the solvent ligand to adjust a concentration of the solvent using a combination of temperature and vacuum. This may permit system 100 to operate in a thermochemical mode, where the concentration of active material is increased above its lowest hydrate to approach anhydrous composition (subject to the temperature limits of material used for tanks 10a and 10b).

Figure 2A:
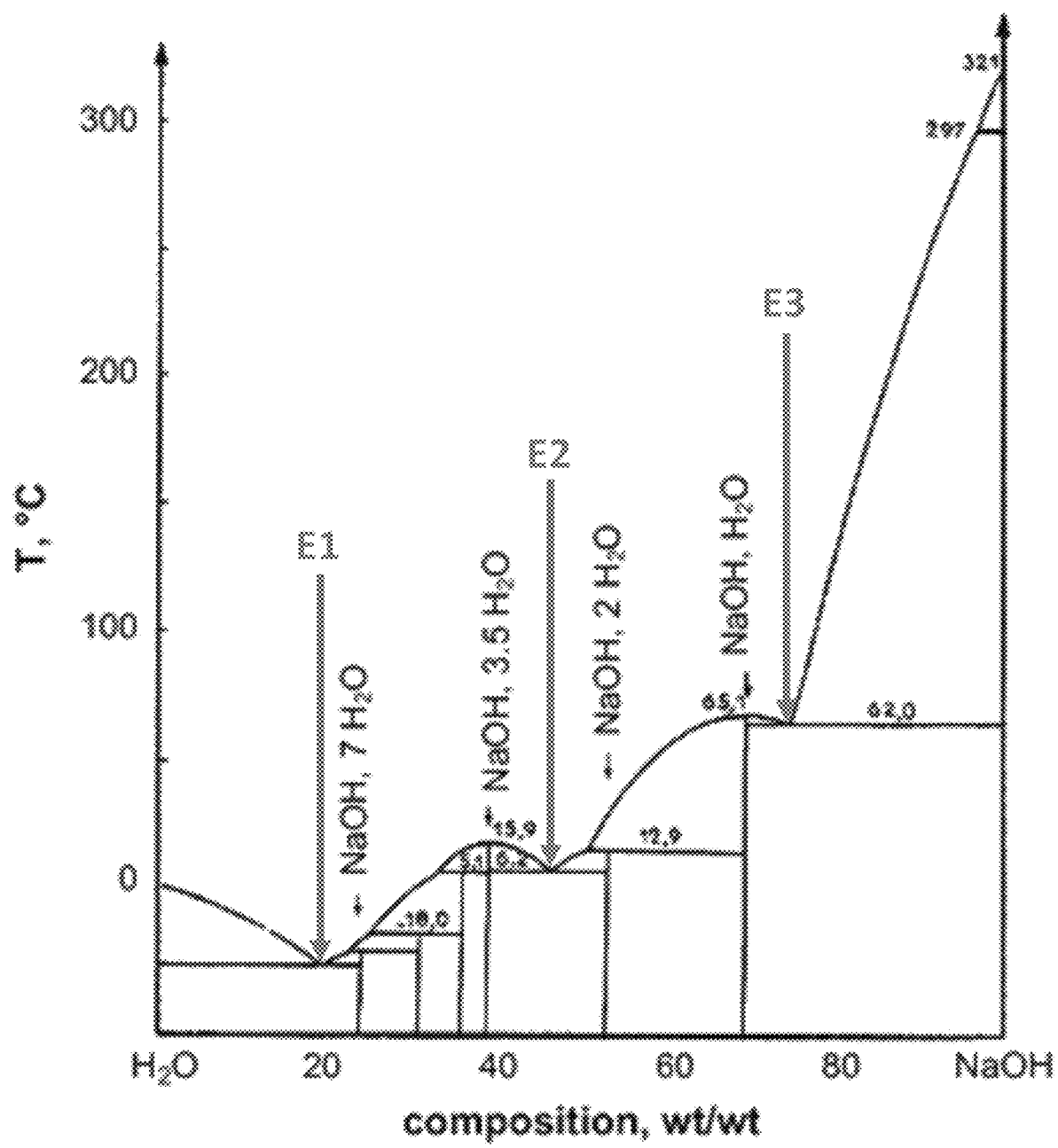
FIG. 2A is a phase diagram of sodium hydroxide and water, showing solid hydrate phases along the bottom, mixed solid plus solution phases, and a fully liquid solution phase along the top.

PCM 30a and PCM 30b may include sodium hydroxide as the active material and water as the solvent. Water may be removed from or added to one or more of the PCMs 30a, 30b. As those skilled in the art will appreciate, a NaOH/water system has more than one eutectic composition, rendering the present TES system 100 tunable based on a concentration of sodium hydroxide and water within PCM 30a and PCM 30b, respectively. A phase diagram of a NaOH/water system is shown in FIG. 2A. As can be seen in the phase diagram of FIG. 2A, a sodium hydroxide and water system, includes three eutectic compositions, labeled E1, E2 and E3, two additional congruent melting point compositions (at about 39% and 69% NaOH by weight), and two-near congruent melting points (at about 24% and 53% NaOH by weight). As those skilled in the art will also appreciate, the amount of water ligand associated with NaOH will vary with the amount of water in the NaOH/water system and phase change temperature and concentration may vary slightly from the indicated values based on impurities within the materials. For example, NaOH may be present in the PCM as $NaOH \cdot 3.5H_2O$, $NaOH \cdot 2H_2O$, $NaOH \cdot H_2O$ or even at anhydrous NaOH under certain conditions. Illustrative formulations for PCMs 30a, 30b are indicated in Table 2.

Table 2 Congruent Compositions and Melting Points of NaOH/Water System

TABLE 2

Congruent Compositions and Melting Points of NaOH/Water System

| NaOH concentration | Phase Transition Temp. | Composition |
|---|---|---|
| 0% | 0° C. | Pure Water |
| 46% | 6° C. | Eutectic of $NaOH \cdot 3.5H_2O$ and $NaOH \cdot 2H_2O$ |
| 39% | 16° C. | $NaOH \cdot 3.5H_2O$ |
| 73% | 62° C. | Eutectic of $NaOH \cdot H_2O$ and anhydrous NaOH |
| 69% | 65° C. | Eutectic of $NaOH \cdot H_2O$ |
| 75% to 100% | various up to 140° C. | Thermochemical mode, approaching anhydrous NaOH |

While aqueous solutions of NaOH and $Mg(NO_3)_2$ are described in detail herein, it should of course be understood that other multi-eutectic active material/solvent systems may be used provided that the eutectics have transition temperatures in useful ranges such as, for example, under 20° C. for stored cooling and over 30° C. for stored heat. In embodiments, PCMs 30a, PCM 30b may be the same or different. For example, PCM 30a may be a sodium hydroxide solution with a different concentration of sodium hydroxide than PCM 30b. In other embodiments, PCM 30a and PCM 30b may be selected based on eutectic points of sodium hydroxide solutions.

When a 46% sodium hydroxide solution with a phase transition temperature of 6° C. is used as the PCM, the TES system 100 may be used for storing cooling for air conditioning operations. When any one of a 69%, 73%, or 80-100% sodium hydroxide solution with a phase transition temperature of about 65, 62 and 80 to 140° C. respectively, the TES system 100 may be used for storing heat for space heating or hot water heating. When a 39% sodium hydroxide solution with a phase transition temperature of about 16° C., is used as the PCM, the TES system 100 may be used for intermediate temperature storage which can be used to boost efficiency at an evaporator source (for heat pump operation in a heating mode) and as a condenser source (for heat pumps operation in an air conditioning mode) or for stored cooling in a very dry climate. Heat pumps are more efficient when the delta T between evaporator and condenser is low. So, the 6° C. eutectic is more efficient than ice storage (below 0° C.), and the 16° C. 3.5-hydrate is notably more efficient as a condenser temperature compared to rejecting heat to a cooling tower at 40° C. or higher, during a very hot afternoon. The target storage temperature of TES system 100 may be re-tuned to match the cooling, dehumidification and ventilation needs of the building as weather and building occupancy changes.

Figure 2B:
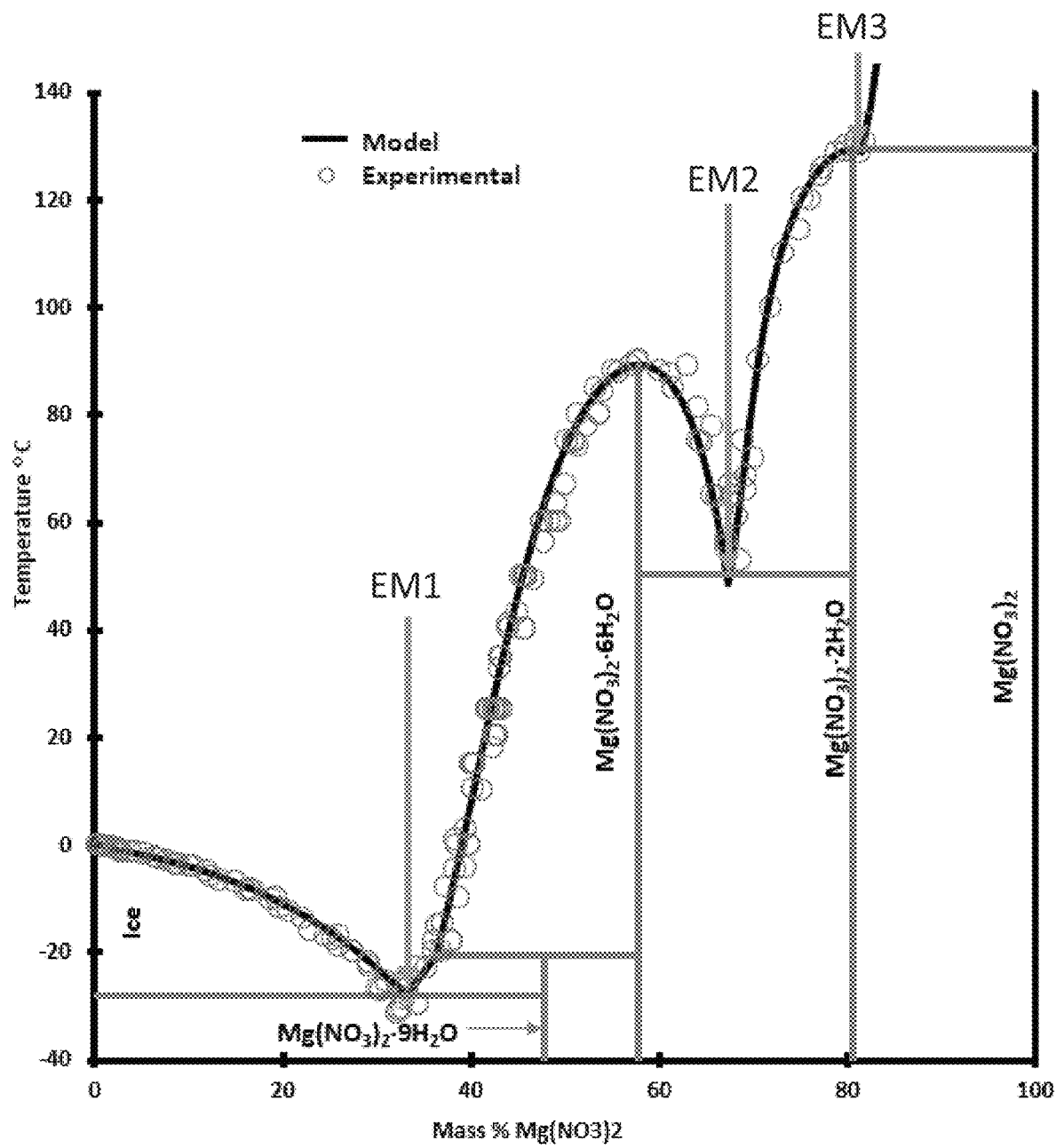
FIG. 2B is a phase diagram of magnesium nitrate and water, showing solid hydrate phases along the bottom, mixed solid plus solution phases, and a fully liquid solution phase along the top.

In another embodiment, PCMs 30a, 30b may be solutions of magnesium nitrate and water. PCMs 30a, 30b may be selected based on eutectic points of magnesium nitrate solutions. As can be seen in the phase diagram of FIG. 2B, a magnesium nitrate and water system includes three eutectic compositions labeled EM1, EM2 and EM3. When an 82% magnesium nitrate solution with a phase transition temperature of about 130° C. is used as the PCM, the TES system 100 may be used for heat storage, including heat storage for steam heating systems. When an about 58% magnesium nitrate solution with a phase transition temperature of about 90° C. is used as the PCM, the TES system 100 may be used for daily storage for reheat. When an about 68% magnesium nitrate solution with a phase transition temperature of about 50° C. is used as the PCM, the TES system 100 may be used as a source temperature for boosting the efficiency of a high temperature heat pump delivering heat to low pressure steam or very hot water temperatures.

TES system 100 may be selectively configured in a summer mode or a winter mode without changing the total quantity of active material of the PCM to provide different amounts of heat and/or cold storage based on different seasonal heating/cooling requirements. In summer mode, TES system 100 may be configured with both tank 10a and tank 10b for stored cooling. When PCMs 30a, 30b are sodium hydroxide solutions, TES system 100 in summer mode may be configured with PCM 30a being a 46% sodium hydroxide solution (with a phase transition temperature of 6° C.), and PCM 30b being either also a 46% sodium hydroxide solution or with PCM 30b being a 39% sodium hydroxide solution (with a phase transition temperature of 16° C.). TES system 100 in summer mode may provide HVAC systems with cold storage for both cooling and humidity control. As those skilled in the art will appreciate, an optimal temperature evaporator temperature for air conditioning in a humid climate is about 8° C. to maintain 50% relative humidity in conditioned air at about 21° C., whereas ice-based TES systems are notably less efficient due to the freezing point of water being 0° C. The Coefficient of Performance (COP) of a vapor compression cycle decreases with a higher temperature difference between an evaporator and a condenser.

In winter mode, TES system 100 may be configured with tank 10a for heat recovery and tank 10b for heat storage. When PCM 30a and PCM 30b are sodium hydroxide solutions, TES system 100 in winter mode may be configured with PCM 30a being water (0% sodium hydroxide solution) for heat recovery about 0 and 40° C., and PCM 30b being about 69% or 73% sodium hydroxide solution (with a phase transition temperature of 65° C. or 62° C. respectively).

TES system 100 may be configured to transition from summer mode to winter mode when initially tank 10a and tank 10b are in summer mode and PCM 30a and PCM 30b are both 46% sodium hydroxide solutions or PCM 30a is a 46% sodium hydroxide solution and PCM 30b is a 39% sodium hydroxide solution or 53% sodium hydroxide. Tanks 10a, 10b may each be heated to about 80° C. to about 100° C. by energy sources 60a and 60b respectively to heat, volatize, evaporate or sparge water out of the sodium hydroxide solutions of PCM 30a and PCM 30b until a target concentration of 68 to 73% sodium hydroxide is reached. Volatized water from PCM 30a and PCM 30b may be removed from tanks 10a, 10b through vents 45a, 45b, respectively. Separator 120 may also sparge or membrane separate water from PCM 30a and/or PCM 30b until a target concentration of 69% to 73% sodium hydroxide is reached. By selecting two intermediate concentrations for summer mode, and a very concentrated solution in one tank and water in a second tank, a sealed system—with no active material added or removed—can supply seasonally appropriate energy storage with a much smaller footprint than separate, non-tunable stored heat and stored cooling modules.

To transition TES system 100 to winter mode, PCM 30a and PCM 30b may be combined within one of tanks 10a or 10b after reaching target concentration of 69% to 73% sodium hydroxide, either by pumping PCM 30a from tank 10a to tank 10b with pump 70a, or by pumping PCM 30b from tank 10b to tank 10a with pump 70b. One of tank 10a or tank 10b may be full of PCM with a target concentration of 69% to 73% sodium hydroxide and other tank 10a or 10b may be empty. Empty tank 10a or 10b may be rinsed by water supply 90 to clean the tank and subsequently filled with distilled or deionized water from distilled or deionized water supply 110.

After adjustment and tuning, TES system 100 may be configured in winter mode, with a solution having a target concentration of 69% to 73% sodium hydroxide as PCM 30a within tank 10a to store mid-grade heat and water as PCM 30b within tank 10b for low-grade heat recovery. Low-grade heat recovery may include, for example, collecting heat from a solar thermal or PhotoVoltaic and Thermal (PVt) panel or recovering low-grade sensible and latent heat from a fueled on-site power device which contains water in its exhaust such as a Proton-exchange membrane (PEM) fuel cell consuming hydrogen or a solid oxide fuel cell (SOFC) consuming biogas or natural gas.

TES system 100 may also be configured to transition from winter mode to summer mode. When tank 10a and tank 10b are in winter mode, one of PCM 30a and PCM 30b may be water and the other may be a solution with a concentration of 69% to 73% sodium hydroxide. Energy source 60a or energy source 60b may heat whichever of tank 10a or tank 10b contains PCM solution with a concentration of 69% to 73% sodium hydroxide to liquify PCM solution with a concentration of 69% to 73% sodium hydroxide. Pump 70a may pump some of PCM 30a from tank 10a to tank 10b, and pump 70b may pump some of PCM 30b from tank 10b to tank 10a. Pumping of PCM 30a from tank 10a to tank 10b and PCM 30b from tank 10b to tank 10a may be continually repeated so that PCM 30a and PCM 30b are pumped back and forth multiple times. Pumping of PCM 30a from tank 10a to tank 10b and PCM 30b from tank 10b to tank 10a may be repeated until the levels of PCM 30a and PMC 30b within tanks 10a and 10b are about equal and target concentrations of PCM 30a and PCM 30b are achieved. Target concentrations of PCM 30a may be 46% sodium hydroxide solution or 39% sodium hydroxide solution or 53% sodium hydroxide solution and target concentrations of PCM 30b may be 46% sodium hydroxide solution or 39% sodium hydroxide solution or 53% sodium hydroxide solution based on requirements of TES 100. Target concentrations of PCM 30a and PCM 30b may be verified by independent testing such as by a hydrometer, a temperature sensor or similar sensors, or by titration. Again, no active material needs to be added or removed during this seasonal transition, which is advantageous for reasons including reducing service cost and improving durability.

Figure 3:
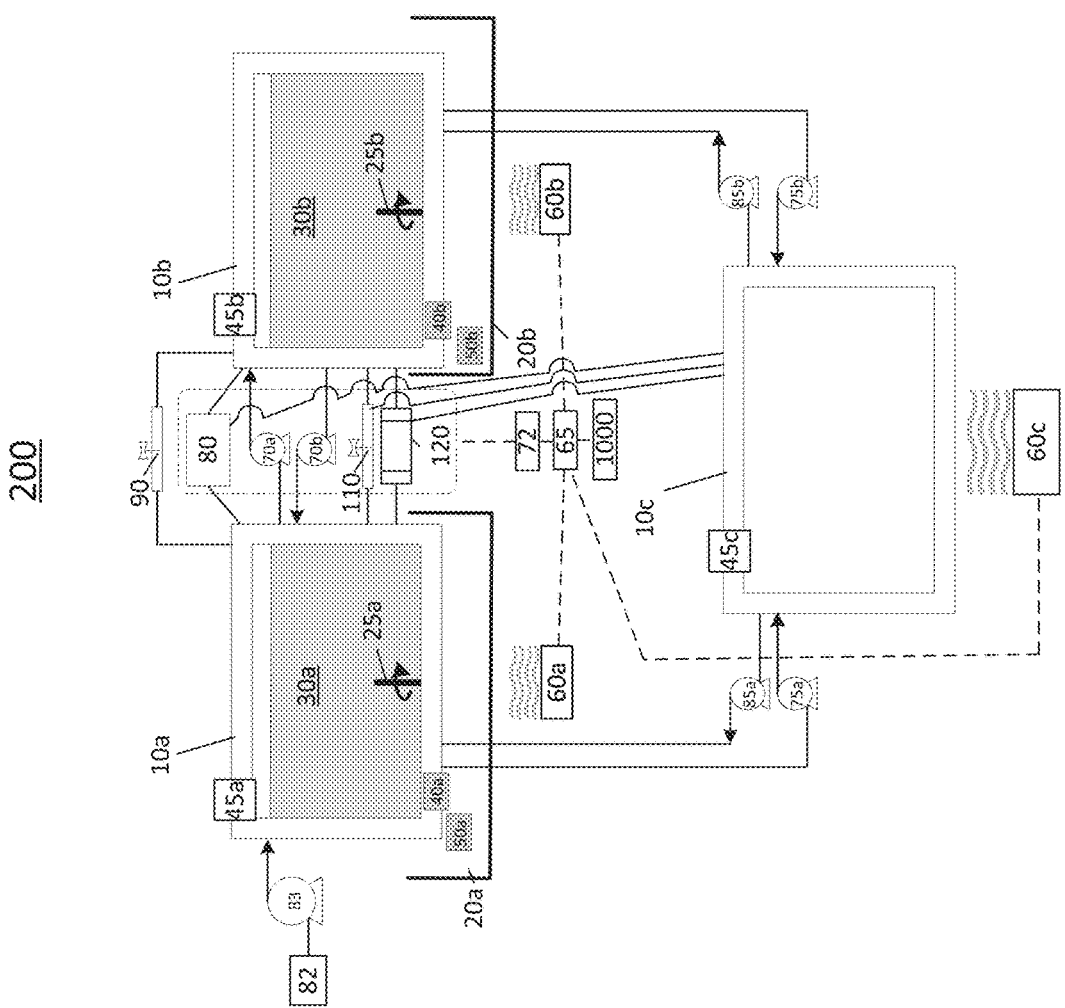
FIG. 3 is a Thermal Energy Storage (TES) system in accordance with another exemplary embodiment of the present disclosure.

FIG. 3 shows a TES system 200, arranged in accordance with at least some alternative embodiments described herein. Those components in FIG. 3 that are labeled identically to components of FIG. 1 will not be described again for the purposes of brevity. System 200 may include all the components of system 100 and further include tank 10c, vent 45c, energy source 60c, and pumps 75a, 75b, 85a, and 85b. Temperature controller 65 may be in communication with energy source 60c and concentration controller may be in communication with pumps 75a, 75b, 85a, and 85b. Inert gas supply 80, distilled or deionized water supply 110, and a separator 120 may be in physical communication with tank 10c.

In embodiments where tank 10a and tank 10b are constructed from plastic materials which may not be heated to about 80° C. to about 100° C. or may not withstand high vacuum, PCM 30a and PCM 30b may be pumped under vacuum by pumps 75a and 75b respectively into tank 10c by concentration controller 72. Tank 10c may be constructed from material which may be heated to about 100° C. or greater (for NaOH) or 140° C. or greater (for $Mg(NO_3)_2$, and/or may withstand a high vacuum. PCM 30a and PCM 30b within tank 10c may be heated to about 80° C. up to about 140° C. by energy source 60c to evaporate, volatize, or sparge solvent out of the solutions of PCM 30a and PCM 30b within tank 10c until a target concentration is reached. When PCM 30a and PCM 30b are sodium hydroxide solutions, PCM 30a and PCM 30b within tank 10c may be heated to about 80° C. to about 100° C. by energy source 60c by concentration controller 72 interacting with temperature controller 65 to evaporate, volatize, or sparge water out of the sodium hydroxide solutions of PCM 30a and PCM 30b within tank 10c until a target concentration of 69% to 73% sodium hydroxide is reached. Volatized water may be removed from tank 10c through vent 45c. Concentration controller 72 may control separator 120 to adjust (increase or concentrate) a concentration of a component within PCM 30a or PCM 30b by (1) imparting a vacuum on the volume of PCM 30a or PCM 30b to remove solvent, (2) sparging PCM 30a or PCM 30b to remove solvent, or (3) membrane separation of a solvent from PCM 30a or PCM 30b. until a target concentration of 69% to 73% sodium hydroxide is reached.

PCM 30a and PCM 30b may be combined within one of tanks 10a or 10b after reaching target concentration of 69% to 73% sodium hydroxide by pumping PCM 30a and PCM 30b from tank 10c to either tank 10a or tank 10b by concentration controller controlling either pump 85a or pump 85b. One of tank 10a or tank 10b may be full of PCM with a target concentration of 69% to 73% sodium hydroxide and other tank 10a or 10b may be empty. As previously stated, empty tank 10a or 10b may be rinsed by water supply 90 to clean the tank and subsequently filled with distilled or deionized water from distilled or deionized water supply 110.

Figure 4:
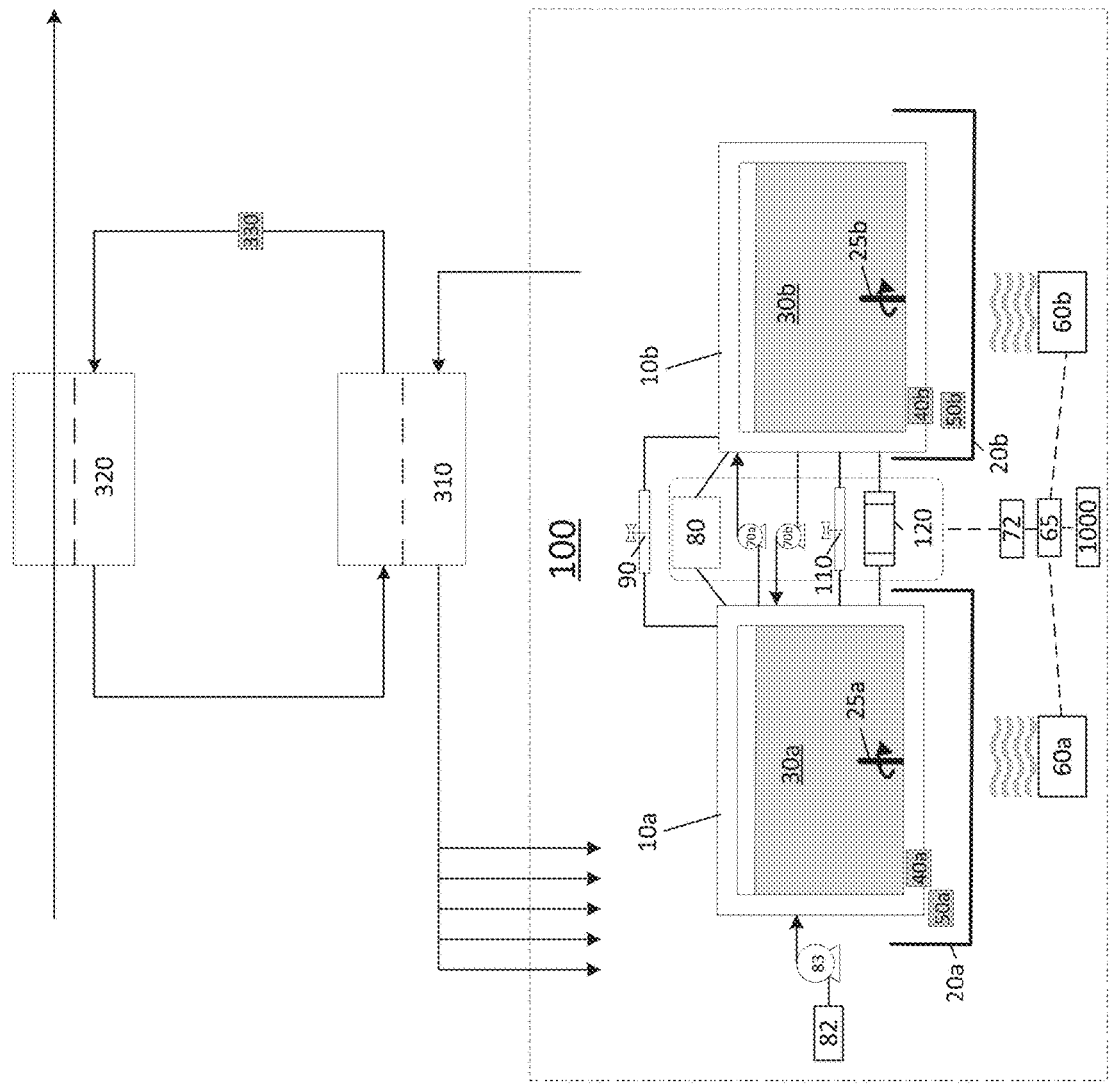
FIG. 4 is a Thermal Energy Storage (TES) system supplying stored cooling/heating to an air handler of an air handler unit in accordance with the present disclosure.

FIG. 4 shows a TES system supplying stored cooling/heat to an air handler of an air handler unit, arranged in accordance with at least some alternate embodiments described herein. Those components in FIG. 4 that are labeled identically to components of FIGS. 1 and 3 will not be described again for the purposes of brevity.

Many climate zones need primarily heating in the winter and primarily cooling in the summer. The seasonal change from summer to winter implies an on-site service call to manage and check the transition, including rinsing and refilling a tank of water. The seasonal change from winter to summer is much more facile, and can be done by remotely controlled mixing of the two volumes. The fine-tuning between 6° C., 13° C. and 16° C. melting point formulations may also be remotely controlled on a near daily basis as weather and HVAC loads vary.

TES 100 may be in thermal communication with a heat exchanger 310. The heat exchanger may be internal or external (as shown) to the tanks 10a and 10b. The PCM may be pumped through the heat exchanger (310) as shown illustratively in FIG. 4, or may be subject to natural or active convection internal to the tank (not shown). When TES system 100 is in summer mode, PCM 30a and PCM 30b may provide cooling. PCM 30a within tank 10a may be a 46% sodium hydroxide solution and PCM 30b within tank 10b may also be a 46% sodium hydroxide solution. In another embodiment, PCM 30a within tank 10a may be a 46% sodium hydroxide solution and PCM 30b within tank 10b may be a 39% sodium hydroxide solution. In a third embodiment, PCM 30a within tank 10a may be a 39% sodium hydroxide solution and PCM 30b within tank 10b may be a 39% sodium hydroxide solution. Any combination of about 39%, 46% or 53% sodium hydroxide may be used.

PCM 30a and PCM 30b having a phase transition temperature of 6° C. may be selected for peak load reduction, as a compressor of a heat pump may be switched off and 100% of required cooling may be supplied by cooling stored within PCM 30a and PCM 30b for an extended period of time. PCM 30a and/or PCM 30b having a phase transition temperature of 12 or 16° C. may be selected for efficiency due to freezing PCM 30a and/or PCM 30b at 13 or 16° C. having a higher coefficient of performance (COP) than freezing PCM 30a and/or PCM 30b at 6° C. PCM 30a and/or PCM 30b having a phase transition temperature of 13 or 16° C. may also be selected for better efficiency with a thermally driven, absorption or adsorption chiller, or in combination with a desiccant or evaporative cooling system, or for utilizing free cooling for TES system 100 from an evaporative cooling tower at night. Cooling may be stored in PCM 30a and PCM 30b during off peak demand hours when energy is less expensive or when temperatures are lower and cooling requirements are lower.

Figures 5A, 5B:
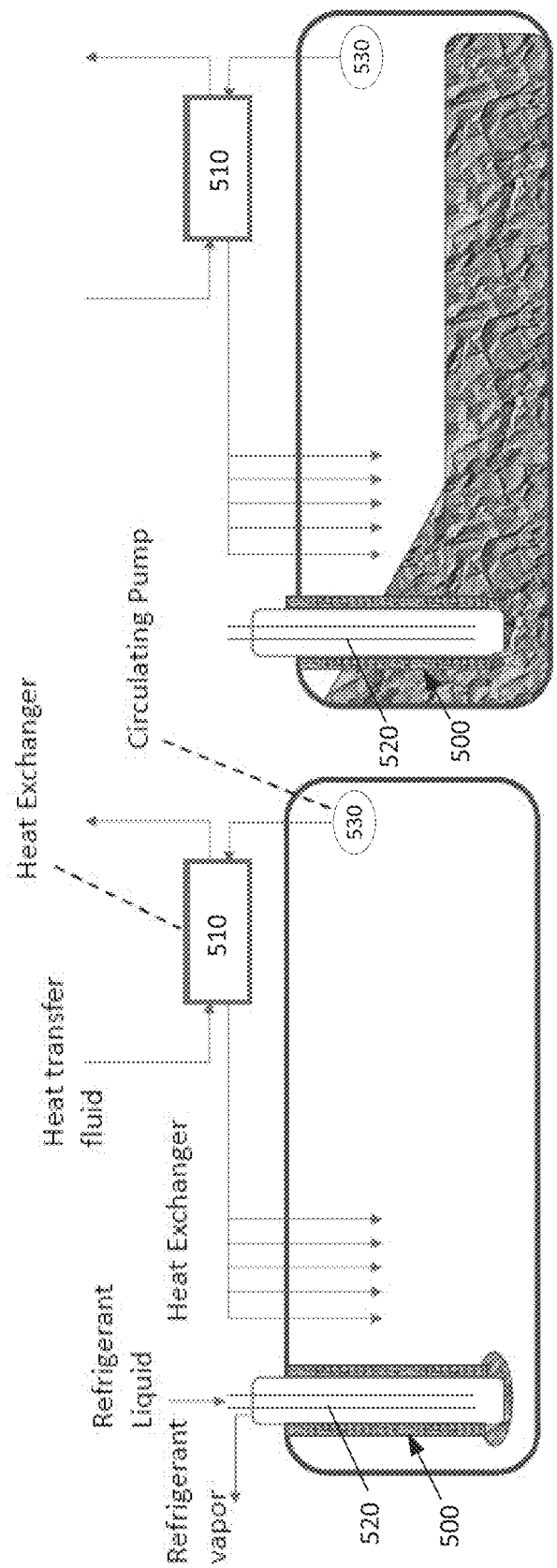
FIGS. 5A and 5B show a system where a lance is used to trigger crystallization of the PCM remote from the primary heat exchanger.

FIGS. 5A and 5B show a lance 500 which can be used to trigger crystallization of the PCM remote from the primary heat exchanger. For example, a refrigerant can be supplied to a coaxial tube 520, such that a shrouded tip can be controlled to well below the freeze point of the PCM, even when the bulk of the PCM is slightly above the temperature where the PCM is fully melted. The surface of the lance may be etched or otherwise provided with surface texture to help initiate crystallization of the PCM. A temperature sensor (not shown) can be used to monitor the tip temperature and to detect crystallization, whereupon the target temperature can be adjusted to reduce the parasitic cooling load. As the rest of the PCM is cooled and begins to freeze, a circulating pump 530 draws liquid PCM from a distant part of the tank. A heat exchanger 510 removes heat from the circulating PCM to or below the freezing temperature. The PCM supercools but is able to freeze upon the growing solid at the other side and towards the bottom of the tank (the solid crystal being denser than the liquid phase). The pump may be remote from the tank (as shown) or internal to the tank. This takes advantage of the property of many PCMs, including NaOH and Mg(NO$_3$)$_2$ to substantially supercool, as the heat transfer rates through the heat exchanger (510) remains high because one can substantially avoid the build-up of frozen material on the heat exchanger pipes or plates. By natural or active convection, supercooled (liquid) PCM is swept past the frozen material at the bottom of the tank, whereupon a portion of this PCM is crystallized and freezes upon the frozen material, and the remaining portion of the PCM is heated to approach the melting point of the PCM (with this heat coming from the heat of crystallization of the portion of the PCM which has frozen) and is swept back towards the heat exchanger (510). This is much more efficient than existing TES systems, which have poor heat transfer rates during the latter part of freezing due to a thick layer of frozen material forming an insulating layer on the prior art heat exchanger pipes or plates.

As shown in FIG. 4, TES system 100 in summer mode may provide cooling to heat exchanger 310. Heat exchanger 310 may be in thermal communication with air handler 320 of an HVAC system. Heat exchanger 310 may provide cooling to air handler 320 during peak demand time intervals and reduce cooling costs. Also shown in FIG. 4, is a circuit containing a heat transfer fluid 330, which may be water, a mixture of water and antifreeze, or a refrigerant as is known in the art. The heat transfer fluid may be circulated by a pump or compressor (not shown) as is known in the art. The use of two heat exchangers in series (510 and 310) is optional, but provides isolation for corrosive PCM materials and may be useful for systems with a large number of tank modules (for example for a large building or district system) or a large number of air handlers (for different zones of the building).

When TES system 100 is in winter mode, PCM 30*a* and PCM 30*b* may provide heating. PCM 30*a* within tank 10*a* may be water (0% sodium hydroxide solution) for heat recovery between 0-80° C. and PCM 30*b* within tank 10*b* may be a 73% sodium hydroxide solution having a phase transition temperature of 62° C. PCM 30*b* having a phase transition temperature of 62° C. may be selected to provide heat for hot water/space heating. PCM 30*a* for heat recovery between 0-80° C. may be selected for condensing heat recovery or for heat pump efficiency improvement in very cold weather using the phase change at 0° C. PMC 30*a* may be a source of sink of heat as a stratified hot water tank and melted PCM 30*b* may supply compressorless heat at high demand by freezing while PCM 30*a* may supply a high source temperature to allow a heat pump to operate efficiently or PCM 30*a* may be preheated by a waste heat recovery process. In instances where a higher temperature may be required for TES system 100, PCM 30*b* may be heated by energy source 60*b* to dry the sodium hydroxide above and to the right of its high temperature eutectic point from about 65° C. to about 140° C. An upper temperature limit for PCM 30*b* may be determined based on tank 10*b* material limits. Further drying of PCM 30*b* may store heat of hydration, and adding back water (as a liquid or vapor) may hydrate and dissolve sodium hydroxide in order to release stored heat.

Heating may be stored in PCM 30*a* and PCM 30*b* during off peak demand hours when energy is less expensive. TES 100 in winter mode may provide heating to heat exchanger 310, and heat exchanger 310 may provide heating to air handler 320 during peak demand time intervals and reduce heating costs.

A device in accordance with the present disclosure may provide reliable, efficient TES performance for air conditioning as well as reliable, efficient TES performance for stored heat and heat recovery functions. A device in accordance with the present disclosure may save on material costs of a TES system by providing four season functionality from a given installation, with a much smaller footprint than a system with separate tanks for stored heat and cooling, or separate tanks for lower and higher temperature heat storage. A device in accordance with the present disclosure may provide a TES system which can be tuned to a summer mode with two tanks for stored cooling and a winter mode with one tank for heat recovery and one tank for stored heat.

A device in accordance with the present disclosure may provide a TES system which can be actively managed to store cooling or heat in different temperature ranges. A device in accordance with the present disclosure may provide a TES system which can store cooling or heating to be used to shift HVAC loads to off-peak or renewable-intensive times. A device in accordance with the present disclosure may provide a TES system which can store cooling or heating to boost an efficiency of daily HVAC operation using free cooling or heating modes such as rejecting or absorbing heat from the ambient environment with lower or no compressor loads.

A device in accordance with the present disclosure may provide a PCM and TES system which can store both cooling and heating with the same active material. A device in accordance with the present disclosure may provide a TES system which utilizes inexpensive sodium hydroxide as a PCM. A device in accordance with the present disclosure may provide a TES system which requires less volume (as little as one seventh (1/7) of the volume) as a comparable hot/chilled water TES system and also more utility compared to dedicated thermal storage at fixed temperatures, where, for example stored cooling is of no use in the winter and stored heat is of little use in the summer.

In embodiments, the present TES system may include a controller to automatically operate the system. Controller 1000 may include a discrete processor and memory unit (not pictured). The controller 1000 may include any suitable processor operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be configured to perform operations, calculations, and/or set of instructions described in the disclosure including, but not limited to, a hardware processor, a field programmable gate array (FPGA), a digital signal processor (DSP), a central processing unit (CPU), a microprocessor, etc. The processor may also include a microprocessor, or a combination of the aforementioned devices (e.g., a combination of a DSP and a microprocessor, a plurality of microprocessors, one or more microprocessors in conjunction with a DSP core, or any other such configuration). Those skilled in the art will appreciate that the processor may be any logic processor (e.g., control circuit) adapted to execute algorithms, calculations, and/or set of instructions described herein.

It should be understood that a single controller may be used to execute the algorithms described herein to perform all calculations and control all operations of the present TES system. Alternatively, two or more separate controllers may be employed to perform selected calculations and/or control selected functions while collectively performing all needed operations. Thus, for example, a first controller 1000*a* (not shown) may be employed to control adjusting the solvent concentration (e.g., energy sources, pumps, vents, etc.) while a second controller 1000b (not shown) may be employed to monitor ambient temperature, energy demand and the HVAC system operations, to determine when recovery of stored heating and/or cooling is to be retrieved from the present TES system. Those skilled in the art reading this disclosure will readily envision other combinations and configurations of controllers that may be used in carrying out the calculations and performance of functions of the algorithm described herein.

Additionally, the memory device(s) may generally include memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD), and/or other suitable memory elements. The memory can store information accessible by processor(s), including instructions that may be executed by processor(s). For example, the instructions may be software or any set of instructions that when executed by the processor(s), cause the processor(s) to perform operations. For the embodiment depicted, the instructions may include a software package configured to operate controller(s) 1000 to, e.g., execute the exemplary method described below with reference to FIGS. 6 and 7.

Figure 6:
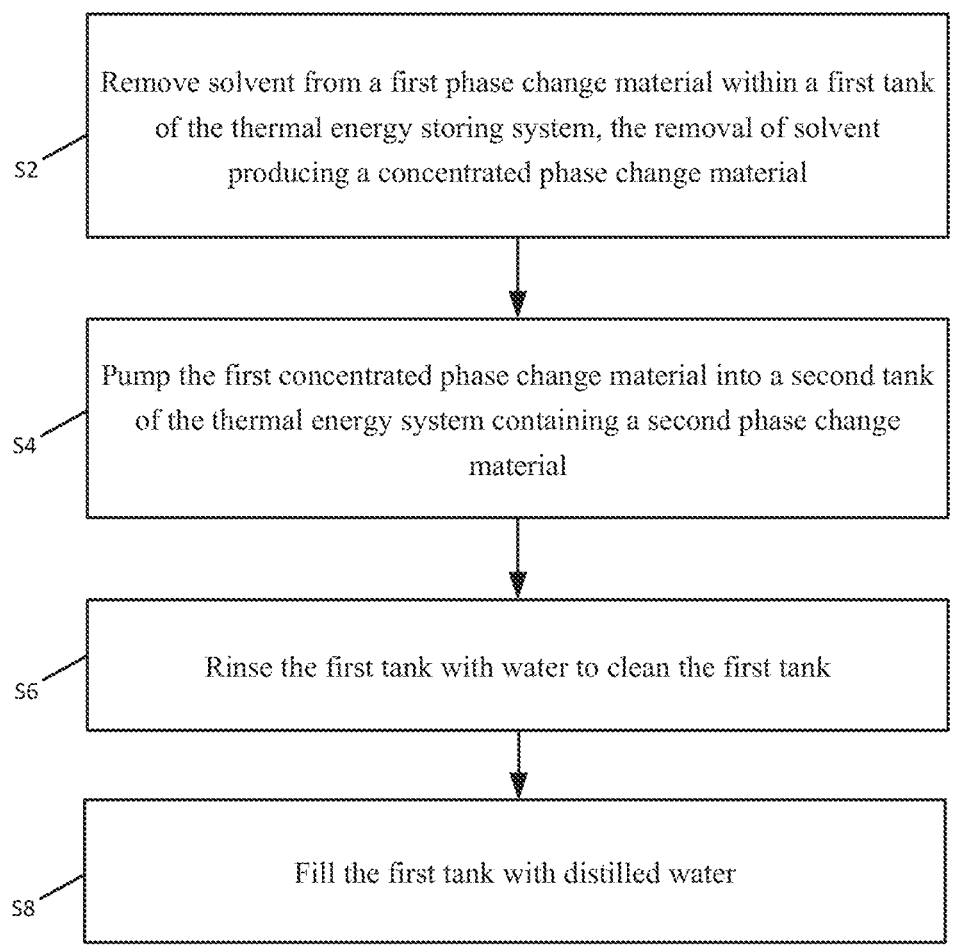
FIG. 6 illustrates a flow diagram for an example method to adjust a thermal energy storing system to a heat storage mode in accordance with the present disclosure.

FIG. 6 illustrates a flow diagram for an example method to adjust a thermal energy storing system to a heat storage mode for use in winter in accordance with at least some aspects presented herein. This example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Initially, as shown in block S2, the concentration of solvent in the PCM is adjusted to a desired level. For example, solvent may be removed from a PCM within a first tank of the TES system. The solvent removed may be sufficient to increase a concentration of the active material within the phase change material and produce concentrated phase change material. For example, where the PCM in is an aqueous sodium hydroxide solution, water can be removed until a concentrated phase change material having 68% to 73% sodium hydroxide is reached. To remove the solvent, the first tank may be heated (e.g., to about 80° C. to about 100° C. when the solvent is water) to heat, evaporate, volatize, or sparge the portion of solvent from the phase change material. Where a system having a third tank is used (see, e.g., FIG. 3), the phase change material may be pumped to the third tank and then heated to heat, evaporate, volatize, or sparge the portion of solvent from the phase change material.

At block S4, the concentration-adjusted phase change material is pumped into the second tank of the thermal energy system. For example, concentrated phase change material may be pumped from the first tank to the second tank, leaving the first tank essentially empty.

The empty first tank of the thermal energy system may then be rinsed clean at block S6. Where the PCM an aqueous sodium hydroxide solution, water can be used to rinse the first tank.

At block S8, the first tank is filled with distilled or deionized water. The distilled or deionized water in the first tank may function as a phase change material for low-grade heat recovery. As noted above, low-grade heat recovery may include, for example, collecting heat from a solar thermal or PVt panel or recovering low-grade sensible and latent heat from a fueled on-site power device which contains water in its exhaust.

At the end of the method of FIG. 6, the system is in winter mode, with the first tank containing distilled or deionized water suitable for use for heat recovery, and the second tank containing the concentrated PCM suitable for use for heat storage.

FIG. 7 illustrates a flow diagram for an example method for an example method to adjust a thermal energy storing system to a cold storage mode for use, e.g., in summer, in accordance with at least some aspects presented herein. This example process may include one or more operations, actions, or functions as illustrated by one or more of blocks S10, S12, and/or S14. Although illustrated as discrete blocks, various blocks may be divided into additional blocks, combined into fewer blocks, or eliminated, depending on the desired implementation.

Initially, at block S10, the concentration of solvent in the PCM is adjusted to a desired level. For example, a first tank of the thermal energy system may be heated sufficient to liquify a phase change material solution within the first tank. The phase change material within the first tank may be at a eutectic point and require heating to liquify. At this initial stage, the second tank contains a liquid solvent suitable for forming a solution with the PCM in the first tank. It should of course be understood that the system resulting from the process of FIG. 6 may be the starting configuration for the process of FIG. 7.

At block S12, some of the PCM from the first tank is pumped to the second tank and some liquid solvent from the second tank is pumped to the first tank.

Pumping of the phase change material from the first tank to the second tank and the pumping of liquid from the second tank to the first tank may be repeated until: 1) levels of liquid within the first tank and the second tank are about equal; 2) a first target concentration of a component of the phase change material solution within the first tank is achieved; and 3) a second target concentration of active material in the phase change material within the second tank is achieved. For example, where the PCM in each tank is an aqueous sodium hydroxide solution, the first target concentration may be a 46% sodium hydroxide solution within the first tank and the second target concentration may be a 39% sodium hydroxide solution within the second tank. In another embodiment where the PCM in each tank is an aqueous sodium hydroxide solution, the first target concentration may be a 46% sodium hydroxide solution within the first tank and the second target concentration may be a 46% sodium hydroxide solution within the second tank.

At the end of the method of FIG. 7, the system is in summer mode, with both tanks in a condition suitable for cold storage, e.g., both tanks configured with a PCM having a phase transition temperature of 6° C., or with a PCM having a phase transition temperature of 16° C., or with one tank configured with a PCM having a phase transition temperature of 6° C., and the other tank configured with a PCM having a phase transition temperature of 16° C.

In aspects, the present TES systems may use a machine learning model to optimize the storage and retrieval of thermal energy. Various types and combinations of machine learning models may be used, such as classical machine learning models, deep learning models, classification models, regression models, neural networks, decision trees, and/or support vector machines, among other machine learning models. The machine learning model(s) may be trained to perform various operations disclosed herein, such as, without limitation, adjusting a phase transition temperature of two or more volumes of a formulation of active material, changing the concentration of solvents in formulations to adjust phase transition temperature, making adjustments seasonally to store cooling for air conditioning or to store heat for space heating, and/or making adjustments to store energy on an evaporator side of a heat pump or to store energy on a condenser side of the heat pump, among other operations. Data used by various operations may be used to train the machine learning models(s). Such data may be obtained from sensors and/or from storage devices. The training may utilize various types of learning, as appropriate, including supervised learning, semi-supervised learning, reinforcement learning, and/or unsupervised learning. Persons skilled in the art will understand how to implement the machine learning models and how to train and apply them. Such aspects are contemplated to be within the scope of the present disclosure.

It should be noted that the processes and techniques described herein are not inherently related to any apparatus and may be implemented by any suitable combination of components. Further, various types of general-purpose devices may be used in accordance with the teachings described herein. It may also prove advantageous to construct specialized apparatus to perform the method steps described herein. This disclosure has been described in relation to the examples, which are intended in all respects to be illustrative rather than restrictive.

In one or more examples, the described techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that may be used to store desired program code in the form of instructions or data structures and that may be accessed by a computer).

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

The foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A thermal energy storage system comprising:
    two or more volumes of a formulation of active material, each formulation of active material in each of the two or more volumes:
        including a solvent and one or more of a salt, a base, or an acid as the active material; and
        having multiple congruent solid phase transition temperatures at different concentrations of the solvent, wherein the formulation at each congruent solid phase transition temperature has the same solvent concentration when in the liquid phase and solid phase;
    wherein a solid phase transition temperature of each volume of the two or more volumes of the formulation of active material is adjustable by changing the concentration of solvent in each formulation from a first concentration with a first congruent solid phase transition temperature to a second concentration with a second congruent solid phase transition temperature and the system is configured to change a concentration of solvent in at least one of the two or more volumes of the formulation of active material by evaporation and condensation of the solvent within the at least one of the two or more volumes of the formulation.

2. The thermal energy storing system of claim 1, wherein the system is configured to adjust the phase transition temperature of each volume of the two or more volumes of the formulation of active material seasonally to (a) store cooling for air conditioning or (b) store heat for space heating.

3. The thermal energy storing system of claim 1, wherein the system is configured to adjust the phase transition temperature of each volume of the two or more volumes of the formulation of active material to either: store energy on an evaporator side of a heat pump; or store energy on a condenser side of the heat pump.

4. The thermal energy storing system of claim 1, wherein at least one volume of the two or more volumes of the formulation of active material includes:
    about 39% NaOH by weight, having a melting temperature of about 16° C., or
    about 53% NaOH by weight, having a melting temperature of about 13° C., or
    about 46% NaOH by weight, having a melting temperature of about 6° C., or
    about 69% NaOH by weight, having a melting temperature of about 65° C., or
    about 73% NaOH by weight, having a melting temperature of about 62° C., or
    pure water, having a melting temperature of about 0° C.

5. The thermal energy storing system of claim 1, wherein at least one volume of the two or more volumes of the formulation of active material includes:
    about 58% $Mg(NO_3)_2$ by weight, having a melting temperature of about 90° C., or
    about 80.5% $Mg(NO_3)_2$ by weight, having a melting temperature of about 130° C., or
    about 68% $Mg(NO_3)_2$ by weight, having a melting temperature of about 50° C., or
    pure water, having a melting temperature of about 0° C.

6. A thermal energy storing system comprising:
    a first tank containing a volume of a formulation of active material including a solvent and one or more of a salt, a base, or an acid as the active material, the formulation having multiple congruent solid phase transition temperatures at different concentrations of the solvent, wherein the formulation at each congruent solid phase transition temperature has the same solvent concentration when in the liquid phase and solid phase;
    a temperature controller configured to control a temperature of the formulation within the first tank; and a concentration controller configured to adjust the concentration of the solvent in the formulation, wherein the solid phase transition temperature of the volume of the formulation of active material is adjustable by changing the concentration of solvent in the formulation from a first concentration with a first congruent solid phase transition temperature to a second concentration with a second congruent solid phase transition temperature and the system is configured to change a concentration of solvent in the volume of the formulation of active material by evaporation and condensation of the solvent within the at least one of the two or more volumes of the formulation.

7. The thermal energy system of claim 6, wherein the concentration controller is configured to adjust the concentration of the solvent in the formulation by controlling any one or a combination of the following:
an inert gas supply configured to provide a purge gas to adjust a phase transition temperature of the formulation;
a solvent supply configured to provide solvent to adjust a concentration of the solvent in the formulation;
a separator configured to perform one or more of the following:
impart a vacuum on the volume of the formulation to remove solvent;
sparge the formulation to remove solvent; and
membrane separate solvent from the formulation; and
wherein the concentration controller is further configured to communicate with the temperature control to evaporate, volatize, or sparge solvent out of the formulation.

8. The thermal energy storing system of claim 6, wherein the system is configured to adjust a concentration of the solvent seasonally to (a) store cooling for air conditioning or (b) store heat for space heating.

9. The thermal energy storing system of claim 6, wherein the system is configured to adjust a phase transition temperature of the volume of the formulation to either: store energy on an evaporator side of a heat pump; or store energy on a condenser side of the heat pump.

10. The thermal energy storing system of claim 6, wherein sodium hydroxide is the active material and water is the solvent, and the system is configured to adjust a concentration of water to provide a formulation containing about 39% sodium hydroxide by weight, and having a melting temperature of about 16° C., wherein a temperature of the formulation is adjusted to a freezing temperature below about 16° C. or to a melting temperature above about 16° C.

11. The thermal energy storing system of claim 6, wherein sodium hydroxide is the active material and water is the solvent, and the system is configured to adjust a concentration of water to provide a formulation containing about 46% sodium hydroxide by weight, and having a melting temperature of about 6° C., wherein a temperature of the formulation is adjusted to a freezing temperature below about 6° C. or to a melting temperature above about 6° C.

12. The thermal energy storing system of claim 6, wherein sodium hydroxide is the active material and water is the solvent, and the system is configured to adjust a concentration of the water to provide a formulation containing about 73% sodium hydroxide by weight and having a melting temperature of about 62° C., wherein a temperature of the formulation is adjusted to a freezing temperature below about 62° C. or to a melting temperature above about 62° C.

13. The thermal energy storing system of claim 6, wherein sodium hydroxide is the active material and water is the solvent, and the system is configured to adjust a concentration of the water to provide a formulation containing about 69% sodium hydroxide by weight, and having a melting temperature of about 65° C., wherein a temperature of the formulation is adjusted to a freezing temperature below about 65° C. or to a melting temperature above about 65° C.

14. The thermal energy storing system of claim 6, wherein sodium hydroxide is the active material and water is the solvent, and the system is configured to adjust a concentration of the water to provide a formulation containing about 53% sodium hydroxide by weight, and having a melting temperature of about 13° C., wherein a temperature of the formulation is adjusted to a freezing temperature below about 13° C. or to a melting temperature above about 13° C.

15. The thermal energy storing system of claim 6, wherein magnesium nitrate is the active material and water is the solvent, and the system is configured to adjust a concentration of water to provide a formulation containing about 58% magnesium nitrate by weight, and having a melting temperature of about 90° C., wherein a temperature of the formulation is adjusted to a freezing temperature below about 90° C. or to a melting temperature above about 90° C.

16. The thermal energy storing system of claim 6, wherein magnesium nitrate is the active material and water is the solvent, and the system is configured to adjust a concentration of water to provide a formulation containing about 80.5% magnesium nitrate by weight, and has a melting temperature of about 130° C., wherein a temperature of the formulation is adjusted to a freezing temperature below about 130° C. or to a melting temperature above about 130° C.

17. The thermal energy storing system of claim 6, wherein magnesium nitrate is the active material and water is the solvent, and the system is configured to adjust a concentration of water to provide a formulation containing about 68% magnesium nitrate by weight, and has a melting temperature of about 50° C., wherein a temperature of the formulation is adjusted to a freezing temperature below about 50° C. or to a melting temperature above about 50° C.

18. The thermal energy storing system of claim 6, further comprising a second tank configured to collect and condense solvent evaporated from the first volume of the formulation of active material.

19. The thermal energy storing system of claim 18, wherein the second tank contains a second volume of a formulation of active material including a solvent and one or more of a salt, a base, or an acid as the active material, the formulation having multiple congruent solid phase transitions at lower concentrations of the active material and the thermal energy system includes a first pump to pump material from the first tank to the second tank and a second pump to pump material from the second tank to the first tank.

20. The thermal energy storing system of claim 18, wherein upon addition of active material to the first tank a volume in the first tank is maintained about constant by evaporating solvent from the volume of the formulation of active material in the first tank.

21. The thermal energy storing system of claim 18, wherein the second tank contains water.

22. The thermal energy storing system of claim 6, wherein the active material is a salt, a base, or an acid having a solvent ligand, and a concentration of the solvent is adjusted by substantially depleting the active material of the solvent ligand, so as to use a higher capacity thermochemical mode.

23. The thermal energy storing system of claim 6, further comprising a source of inert gas configured to pump inert gas into a head space of the first tank.

24. The thermal energy storing system of claim 6, further comprising a heat exchanger configured to store and recover one of heating or cooling from the first tank.

25. The thermal energy system of claim 6, further comprising a mixer within the tank to provide active mixing to avoid phase separation of the formulation prior to freezing transitions, or to enhance heat transfer during the freezing process or the melting process by active convection.

26. The thermal energy system of claim 6, wherein the thermal energy system includes a controller, and the controller uses a machine learning model to optimize the storage and retrieval of thermal energy by training the machine learning model to perform various operations including adjusting a phase transition temperature of two or more volumes of a formulation of active material, changing the concentration of solvents in formulations to adjust phase transition temperature, making adjustments seasonally to store cooling for air conditioning or to store heat for space heating, and/or making adjustments to store energy on an evaporator side of a heat pump or to store energy on a condenser side of the heat pump.

27. The thermal energy system of claim 24, wherein the thermal energy system includes a lance to trigger crystallization of the formulation remote from said heat exchanger.

\* \* \* \* \*